United States Patent
Rector et al.

(10) Patent No.: US 10,635,504 B2
(45) Date of Patent: Apr. 28, 2020

(54) API VERSIONING INDEPENDENT OF PRODUCT RELEASES

(71) Applicant: Microsoft Technology Licensing, LLC, Redmond, WA (US)

(72) Inventors: Brent Rector, Redmond, WA (US); Lawrence William Osterman, Woodinville, WA (US); Tassaduq Basu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 542 days.

(21) Appl. No.: 14/515,516

(22) Filed: Oct. 16, 2014

(65) Prior Publication Data

US 2016/0110229 A1   Apr. 21, 2016

(51) Int. Cl.
    *G06F 9/54* (2006.01)
    *G06F 8/30* (2018.01)
    *G06F 9/48* (2006.01)

(52) U.S. Cl.
    CPC ............. *G06F 9/54* (2013.01); *G06F 8/30* (2013.01); *G06F 9/4881* (2013.01); *G06F 9/541* (2013.01)

(58) Field of Classification Search
    CPC . G06F 9/54; G06F 8/30; G06F 9/4881; G06F 9/541
    See application file for complete search history.

(56) References Cited

U.S. PATENT DOCUMENTS

| | | |
|---|---|---|
| 5,097,533 A | 3/1992 | Burger |
| 5,336,422 A | 8/1994 | Scheinbeim et al. |
| 5,339,422 A | 8/1994 | Brender |
| 5,504,857 A | 4/1996 | Baird |
| 5,594,863 A | 1/1997 | Stiles |
| 5,873,118 A | 2/1999 | Letwin |
| 5,910,180 A | 6/1999 | Flory |
| 5,964,835 A | 10/1999 | Fowler |
| 6,233,731 B1 | 5/2001 | Bond |
| 6,269,431 B1 | 7/2001 | Dunham |
| 6,446,137 B1 | 9/2002 | Vasudevan |
| 6,629,264 B1 | 9/2003 | Sicola |
| 6,643,612 B1 | 11/2003 | Lahat |

(Continued)

FOREIGN PATENT DOCUMENTS

| | | |
|---|---|---|
| CN | 1513145 A | 7/2004 |
| CN | 1517885 A | 8/2004 |

(Continued)

OTHER PUBLICATIONS

CN Notification to Grant Patent Right for Invention for Application No. 201080056154.2, dated Feb. 16, 2016.

(Continued)

*Primary Examiner* — Doon Y Chow
*Assistant Examiner* — Kimberly L Jordan

(57) ABSTRACT

Technologies for a contract platform versioned according to the set of API contracts provided. API contracts are both development-time and run-time executable components. Each such contract defines a particular set of APIs that are fully supported at run-time by a corresponding implementation module. Contract applications are written to API contracts as opposed to the monolithic APIs of a legacy platform. Such applications are "platform agnostic".

23 Claims, 8 Drawing Sheets

(56) References Cited

U.S. PATENT DOCUMENTS

| | | |
|---|---|---|
| 6,643,672 B1 | 11/2003 | Lebel |
| 6,691,302 B1 | 2/2004 | Skrzynski |
| 6,813,770 B1 | 11/2004 | Allavarpu |
| 6,925,476 B1 | 8/2005 | Muller |
| 6,928,555 B1 | 8/2005 | Drew |
| 6,993,744 B2 | 1/2006 | Hills |
| 7,065,742 B1 | 6/2006 | Bogdan |
| 7,130,855 B2 | 10/2006 | Lebel |
| 7,171,539 B2 | 1/2007 | Mansell |
| 7,219,339 B1 | 5/2007 | Goyal |
| 7,325,007 B2 | 1/2008 | Castro |
| 7,330,971 B1 | 2/2008 | Kukreja |
| 7,334,124 B2 | 2/2008 | Pham |
| 7,380,235 B1 | 5/2008 | Fathalla |
| 7,440,966 B2 | 10/2008 | Adkins |
| 7,441,274 B1 | 10/2008 | Drew |
| 7,444,621 B2 | 10/2008 | Pletcher |
| 7,458,082 B1 | 11/2008 | Slaughter |
| 7,533,127 B2 | 5/2009 | Zimmerman |
| 7,546,602 B2 | 6/2009 | Hejlsberg |
| 7,546,607 B2 | 6/2009 | Demsey |
| 7,552,148 B2 | 6/2009 | Liu |
| 7,581,231 B2 | 8/2009 | Smith |
| 7,617,259 B1 | 11/2009 | Muth |
| 7,620,721 B2 | 11/2009 | Suriyanarayanan |
| 7,721,254 B2 | 5/2010 | Relyea |
| 7,783,720 B1 | 8/2010 | Allavarpu |
| 7,840,752 B2 | 11/2010 | Hu |
| 7,941,402 B2 | 5/2011 | Smits |
| 7,966,622 B1 | 6/2011 | Purser |
| 7,971,208 B2 | 6/2011 | Stokes |
| 8,037,025 B2 | 10/2011 | Fang |
| 8,250,524 B2 | 8/2012 | Barnett et al. |
| 8,433,865 B2 | 4/2013 | Miller |
| 8,595,714 B1 | 11/2013 | Hamer |
| 8,695,021 B2 | 4/2014 | Pierson et al. |
| 8,776,094 B2 | 7/2014 | Cross |
| 8,793,359 B1 | 7/2014 | Fiebig et al. |
| 8,793,440 B2 | 7/2014 | Miller |
| 9,110,770 B1 | 8/2015 | Raju |
| 9,229,790 B2 | 1/2016 | Pierson et al. |
| 9,563,487 B2 | 2/2017 | Rector et al. |
| 9,830,146 B2 | 11/2017 | Rector et al. |
| 10,089,119 B2 | 10/2018 | Kishan et al. |
| 2001/0037417 A1 | 11/2001 | Meyer |
| 2002/0078244 A1 | 6/2002 | Howard |
| 2002/0161596 A1 | 10/2002 | Johnson |
| 2003/0028685 A1 | 2/2003 | Smith |
| 2003/0110312 A1 | 6/2003 | Gunduc |
| 2003/0140070 A1 | 7/2003 | Kaczmarski |
| 2003/0172196 A1 | 9/2003 | Hejisberg |
| 2003/0188043 A1 | 10/2003 | Woodall |
| 2003/0191864 A1 | 10/2003 | Govindarajapuram |
| 2004/0039827 A1 | 2/2004 | Thomas |
| 2004/0049481 A1 | 3/2004 | Blevins |
| 2004/0078396 A1 | 4/2004 | Lebel |
| 2004/0107416 A1 | 6/2004 | Buban |
| 2004/0148586 A1 | 7/2004 | Gilboa |
| 2004/0201600 A1 | 10/2004 | Kakivaya |
| 2004/0225873 A1 | 11/2004 | Diaz |
| 2004/0243605 A1 | 12/2004 | Bernstein |
| 2004/0260691 A1 | 12/2004 | Desai |
| 2004/0267699 A1 | 12/2004 | Zimmerman |
| 2005/0081184 A1 | 4/2005 | Deedwaniya |
| 2005/0091271 A1 | 4/2005 | Srinivas |
| 2005/0091671 A1 | 4/2005 | Deem |
| 2005/0102129 A1 | 5/2005 | Bond |
| 2005/0114832 A1 | 5/2005 | Manu |
| 2005/0144591 A1 | 6/2005 | Banks |
| 2005/0182828 A1 | 8/2005 | Lamkin |
| 2005/0183097 A1 | 8/2005 | Carter |
| 2005/0204108 A1 | 9/2005 | Ofek |
| 2005/0262181 A1 | 11/2005 | Schmidt |
| 2005/0267914 A1 | 12/2005 | Moore |
| 2005/0268308 A1 | 12/2005 | Tang |
| 2006/0004709 A1 | 1/2006 | Borthakur |
| 2006/0112140 A1 | 5/2006 | McBride |
| 2006/0129745 A1 | 6/2006 | Thiel |
| 2006/0161910 A1 | 7/2006 | Bonsteel |
| 2006/0179146 A1 | 8/2006 | Marucheck |
| 2006/0179440 A1 | 8/2006 | Besbris |
| 2006/0215199 A1 | 9/2006 | Morita |
| 2006/0230395 A1 | 10/2006 | Paul |
| 2006/0277194 A1 | 12/2006 | Britt |
| 2006/0287890 A1 | 12/2006 | Stead |
| 2007/0039010 A1 | 2/2007 | Gadre |
| 2007/0088710 A1 | 4/2007 | Song |
| 2007/0124334 A1 | 5/2007 | Pepin |
| 2007/0143501 A1 | 6/2007 | Pasha |
| 2007/0156913 A1 | 7/2007 | Miyamoto |
| 2007/0209043 A1* | 9/2007 | Hare ..................... G06F 9/541 719/330 |
| 2008/0010515 A1 | 1/2008 | Robinson |
| 2008/0034381 A1 | 2/2008 | Jalon |
| 2008/0066048 A1 | 3/2008 | Hafermann |
| 2008/0077590 A1 | 3/2008 | Pandit |
| 2008/0082974 A1 | 4/2008 | Ellison |
| 2008/0134156 A1 | 6/2008 | Osminer |
| 2008/0134206 A1 | 6/2008 | Stokes |
| 2008/0164973 A1 | 7/2008 | Mamaloukas |
| 2008/0261689 A1 | 10/2008 | Evans |
| 2008/0294700 A1 | 11/2008 | Sugimoto |
| 2009/0019380 A1 | 1/2009 | Tanaka |
| 2009/0024986 A1 | 1/2009 | Meijer |
| 2009/0044170 A1 | 2/2009 | Bernardi |
| 2009/0063562 A1 | 3/2009 | Dinger |
| 2009/0125822 A1 | 5/2009 | Karatal |
| 2009/0132285 A1 | 5/2009 | Jakobovits |
| 2009/0132760 A1 | 5/2009 | Flynn |
| 2009/0158238 A1 | 6/2009 | Jung |
| 2009/0164973 A1* | 6/2009 | Barnett ..................... G06F 8/51 717/110 |
| 2009/0187610 A1 | 7/2009 | Guo |
| 2009/0199220 A1 | 8/2009 | Bahlke |
| 2009/0204752 A1 | 8/2009 | Sasaki |
| 2009/0240869 A1 | 9/2009 | O'Krafka |
| 2010/0057784 A1 | 3/2010 | Kapadia |
| 2010/0058305 A1 | 3/2010 | Jones |
| 2010/0100529 A1 | 4/2010 | Erofeev |
| 2010/0275180 A1 | 10/2010 | Alex |
| 2010/0299660 A1 | 11/2010 | Torgersen |
| 2010/0299663 A1 | 11/2010 | Weissman |
| 2010/0318968 A1 | 12/2010 | Traut |
| 2011/0072424 A1 | 3/2011 | Choi |
| 2011/0078674 A1 | 3/2011 | Ershov |
| 2011/0082992 A1 | 4/2011 | Fineberg |
| 2011/0145527 A1 | 6/2011 | Miller |
| 2011/0153559 A1 | 6/2011 | Rangarajan |
| 2011/0154378 A1 | 6/2011 | Kishan |
| 2011/0307449 A1 | 12/2011 | Cargille |
| 2011/0307869 A1 | 12/2011 | Cwalina |
| 2011/0314229 A1 | 12/2011 | Miller |
| 2011/0314230 A1 | 12/2011 | Zhang |
| 2012/0222025 A1 | 8/2012 | Pandit |
| 2013/0042258 A1 | 2/2013 | Rector |
| 2013/0055211 A1 | 2/2013 | Fosback |
| 2013/0055291 A1 | 2/2013 | Pierson |
| 2013/0055292 A1 | 2/2013 | Pierson et al. |
| 2013/0282748 A1 | 10/2013 | Liensberger et al. |
| 2013/0338972 A1 | 12/2013 | Chao |
| 2014/0181262 A1 | 6/2014 | Goswarni |
| 2014/0325534 A1 | 10/2014 | Rector et al. |
| 2014/0366011 A1 | 12/2014 | Rector et al. |
| 2015/0020084 A1 | 1/2015 | Pierson et al. |
| 2017/0084132 A1 | 3/2017 | Scalisi |

FOREIGN PATENT DOCUMENTS

| | | |
|---|---|---|
| CN | 1776595 A | 5/2006 |
| CN | 1936853 A | 3/2007 |
| CN | 101051324 A | 10/2007 |
| CN | 101233488 A | 7/2008 |
| CN | 101344846 A | 1/2009 |
| CN | 101529396 A | 9/2009 |

(56) References Cited

FOREIGN PATENT DOCUMENTS

| | | |
|---|---|---|
| CN | 101542436 A | 9/2009 |
| CN | 103718155 A | 4/2014 |
| EP | 0 371 941 A2 | 6/1990 |
| EP | 1 526 451 A2 | 4/2005 |
| EP | 1 653 340 A1 | 5/2006 |
| EP | 1 845 444 A1 | 10/2007 |
| EP | 2 088 506 A1 | 8/2009 |
| JP | 2001-296996 A | 10/2001 |
| JP | 2003-223350 | 8/2003 |
| JP | 2004-326736 A | 11/2004 |
| JP | 2005-129022 A | 5/2005 |
| JP | 2005-182775 A | 7/2005 |
| JP | 2006-106868 | 4/2006 |
| JP | 2006-216030 A | 8/2006 |
| JP | 2007-316944 | 6/2007 |
| JP | 2009-282752 | 3/2009 |
| MX | 2017017179 A | 5/2018 |
| RU | 2 335 796 C2 | 10/2008 |
| RU | 2 421 798 C2 | 6/2011 |
| TW | I365387 A | 6/2006 |
| TW | 200636567 A | 10/2006 |
| TW | 200805150 A | 1/2008 |
| WO | 01/16730 A2 | 3/2001 |
| WO | 2005/045593 A2 | 5/2005 |
| WO | 2009/004620 A2 | 1/2009 |
| WO | 2013/022465 A1 | 2/2013 |

OTHER PUBLICATIONS

CN Second Office Action for Application No. 201080056154.2, dated Mar. 9, 2015.
RU Decision on Grant for Application No. 2012129205, dated Apr. 2, 2015.
CN Third Office Action for Application No. 201080056154.2, dated Sep. 22, 2015.
CN First Office Action for Application No. 201080056154.2, dated Jun. 25, 2014.
JP Notice of Reason for Rejection for Application No. 2012-543128, dated Apr. 30, 2014.
CN Decision on Rejection for Application No. 201180029786.4, dated Jun. 4, 2014.
AU Patent Examination Report No. 1 for Application No. 2010328591, dated Feb. 12, 2014.
CN Search Report for Application No. 201180029786.4, dated Sep. 25, 2013.
PCT International Search Report and Written Opinion for Application No. PCT/US2011/039071, Reference 329477-02, dated Dec. 7, 2011.
Calin, "Fast File Writes Without Having Large Data Flushes to Disk", eggheadcafe.com, Mar. 23, 2007.
"Xbox 360 HDD Cache clear Code Discovered [Update 1]—Joystiq", Jun. 9, 2006.
Riska, "Disk Drive Level Workload Characterization", In Proceedings of the USENIX Annual Technical Conference, May 30-Jun. 3, 2006.
"Can Not Write to File in Java", LinuxQuestions.org, Published on or before.
"Lecture 19: Transactions: Reliability from Unreliable Components", Published on or before.
"Error Detection and Correction", Wikipedia, Published on or before.
PCT International Search Report and Written Opinion for Application No. PCT/US2010/056311, Reference 328569-02, dated Jul. 18, 2011.
Eggen, "Efficiency of Soap Versus JMS", Proceedings of the International Conference on Internet Computing, Jun. 23-26, 2003.
Pandey, "Dynamically Evolvable Distributed Systems", Proceedings of the 26th International Computer Software and Applications Conference (COMPSAC 2002), Prolonging Software Life: Development and Redevelopment, Aug. 26-29, 2002.
Fulton III, "Mark Russinovich on MinWin, the new core of Windows", Dec. 2, 2009.
Sandakly, "Distributed Shared Memory Infrastructure for Virtual Enterprise in Building and Construction", In the Journal of Intelligent Manufacturing, Apr. 2001.
PCT International Search Report and Written Opinion for Application No. PCT/US2011/055700, Reference 332992-02, dated Sep. 28, 2012.
Nguyen, "A Framework for Diversifying Windows Native APIs to Tolerate Code Injection Attacks", In Proceedings of the 2nd ACM Symposium on Information, Computer and Communications Security, Mar. 20-22, 2007.
"Inside Windows Native API #1", Jul. 24, 2006.
"Building the Componentized Operating System in Microsoft Windows CE 2.1", Microsoft Corporation, Apr. 2000.
Ionescu, "Native Development Kit Readme", Published Online on or before Jan. 19, 2008.
PCT International Search Report and Written Opinion for Application No. PCT/US2011/055704, Reference 332991-02, Sep. 19, 2012.
Kloss, "Source Code: Automatic C Library Wrapping—Ctypes From the Trenches", In The Python Papers Source Codes, Sep. 16, 2009.
Heidrich, "Automatic Generation of Tcl Bindings for C and C++ Libraries", In Proceedings of the Tcl/Tk Workshop, Jul. 1995.
Emery, "Standards, APIs, Interfaces and Bindings", Retrieved on May 5, 2011.
"Microsoft.SqlServer.Server Namespace", Published on or before May 5, 2008.
TW Search Report for Application No. 100136563, dated Sep. 9, 2015, Date of Research Jul. 21, 2015.
TW Search Report for Application No. 100136566, dated Oct. 21, 2015, Date of Research Oct. 15, 2015.
CN Second Office Action for Application No. 201210317710.8, dated Sep. 2, 2015.
JP Notice of Reasons for Rejection for Application No. 2014-524995, dated Aug. 25, 2015.
Stets, "Component-Based APIs for Versioning and Distributed Applications", Jul. 1999.
CN First Office Action and Search Report for Application No. 201210317739.6, dated Apr. 2, 2014.
CN Second Office Action for Application No. 201210317739.6, dated Oct. 22, 2014.
".NET Framework Developer's Guide, Interop Marshaling", Jun. 3, 2009.
".NET Framework Developer's Guide, Interoperating with Unmanaged Code", Jul. 17, 2009.
".NET Framework Tools, Type Library Importer", Jul. 7, 2009.
"Common Desktop Environment (CDE) 2.1", Retrieved May 5, 2011.
"Exposing COM Components to the .NET Framework", Nov. 2007.
"Introducing BEA Tuxedo", Retrieved May 5, 2011.
"Jason Description" Retrieved May 5, 2011.
"Overview of CORBA", In IEEE Communications Magazine on Environments, Feb. 1997.
"Contract Versions—Cloud Identity Client Developer Guide—API v2.0", Previously Published as 'RackspaceSupport Network', Mar. 11, 2012.
"Visual Basic Programming Guide: Introduction to COM Interop", May 28, 2009.
Henkel, "CatchUp! Capturing and Replaying Refactorings to Support API Evolution", In Proceedings of the 27th International Conference on Software Engineering, May 15, 2005.
Hamilton, "Language Integration in the Common Language Runtime", In Proceedings of the ACM Sigplan Conference on Programming Language Design and Implementation, Feb. 1, 2003.
Simon, "Full Eiffel on .NET", Published Online on or before May 18, 2006.
Stets, "Component-Based Operating System API: A Versioning and Distributed Resource Solution", Technical Report MST-TR-99-24, Jul. 1999.

(56) References Cited

OTHER PUBLICATIONS

PCT International Preliminary Report on Patentability, Search Report and Written Opinion for Application No. PCT/US2011/055492, Reference 332995-02, dated Jul. 23, 2012.
EP Search Report for Application No. 11870789.2-1954 / 2742420 PCT/US2011055492, Reference M11707WOEP, dated Jan. 12, 2015.
EP Search Report for Application No. 11871602.6-1954 / 2751675 PCT/US2011055700, Reference M11706WOEP, dated Jan. 9, 2015.
CN First Office Action for Application No. 201210317710.8, dated Nov. 14, 2014.
EP Search Report for Application No. 11871395.7-1954 / 2751673 PCT/US2077055704, Reference M11705WOEP, dated Jan. 30, 2015.
Clark, "Calling Win32 DLLs in C# With P/Invoke", In MSDN Magazine, Jul. 2003.
Pietrek, "Avoiding DLL Hell: Introducing Application Metadata in the Microsoft .NET Framework", In MSDN Magazine, Oct. 2000.
CN Search Report for Application No. 201210317710.8, dated Oct. 17, 2014.
JP notice of Reasons for Rejection for Application No. 2014-528374, dated Oct. 27, 2015.
PCT International Search Report and Written Opinion for Application No. PCT/US2015/055193, Reference 355626-02, dated Dec. 14, 2015.
TW Decision of Patent Examination for Application No. 100136566, dated Jan. 29, 2016.
CN Third Office Action for Application No. 201210317710.8, dated Jan. 28, 2016.
U.S. Appl. No. 12/817,219, filed Jun. 17, 2010, Miller.
U.S. Appl. No. 14/310,892, filed Jun. 20, 2014, Miller.
U.S. Appl. No. 14/339,807, filed Jul. 24, 2014, Miller.
U.S. Appl. No. 12/635,725, filed Dec. 11, 2009, Miller.
U.S. Appl. No. 13/872,896, filed Apr. 29, 2013, Miller.
U.S. Appl. No. 14/668,628, filed Mar. 25, 2015, Miller.
U.S. Appl. No. 61/288,202, filed Dec. 18, 2009, Arun Kishan.
U.S. Appl. No. 12/716,381, filed Mar. 3, 2010, Arun Kishan.
U.S. Appl. No. 13/223,296, filed Aug. 31, 2011, Harold Pierson.
U.S. Appl. No. 14/244,951, filed Apr. 4, 2014, Harold Pierson.
U.S. Appl. No. 13/223,291, filed Aug. 31, 2011, Harold Pierson.
U.S. Appl. No. 13/207,806, filed Aug. 11, 2011, Brent E. Rector.
U.S. Appl. No. 14/298,679, filed Jun. 6, 2014, Brent E. Rector.
U.S. Appl. No. 13/912,444, filed Jun. 7, 2013, Brent Rector.
"API Index", Published on: May 13, 2014 Available at: http://msdn.microsoft.com/en-us/library/windows/desktop/hh920508(v=vs.85).aspx.
"RackspaceSupport Network", Published on: Mar. 11, 2012, Available at: http://docs.rackspace.com/auth/api/v2.0/auth-client-devguide/content/Versions-dle472.html.
"Supporting Different Platform Versions", Published on: Apr. 23, 2012, Available at: http://developer.android.com/training/basics/supporting-devices/platforms.html.
Chipperfield, Robert, "An introduction to cross-platform mobile development technologies", Published on: May 21, 2012, Available at: http://www.codeproject.com/Articles/388811/An-introduction-to-cross-platform-mobile-developme.
Barnett, et al., "Code Contracts—compatible and platform independent", Published on: Dec. 22, 2008, Available at: http://research.microsoft.com/en-us/projects/contracts/.
Olson, Jason, "Reimagining App Development with the Windows Runtime", Retrieved on: Aug. 13, 2014, Available at: http://msdn.microsoft.com/en-us/magazine/jj651567.aspx?utm_source=rss&utm_medium=rss&utm_campaign=windows-runtime-reimagining-app-development-with-the-windows-runtime.
"Developing Mobile Apps—compatible and platform independent", Published on: Sep. 14, 2011, Available at: http://www.twago.com/blog/developing-mobile-apps-compatible-and-platform-independent/.
Behrens, Heiko, "Cross-Platform App Development for iPhone, Android & Co.—A Comparison | Presented at MobileTechCon 2010", Published on: Oct. 11, 2010, Available at:.
McKendrick, Joe, "Why API services need more intelligence to interact", Published on: May 23, 2014, Available at: http://www.zdnet.com/why-api-services-need-more-intelligence-to-interact-7000029793/.
State Intellectual Property Office of the People's Republic of China, Author unknown, CN Second Office Action for Application No. 2011800728136, dated Nov. 30, 2016, p. 1, China.
European Patent Office, EP Communication for Application No. 11870789.2, dated Dec. 2, 2016, 3 pages, Germany.
Australian Patent Office, AU Patent Examination Report No. 1 for Application No. 2011375748, dated Sep. 9, 2016, 3 pages, Australia.
Australian Patent Office, AU Patent Examination Report No. 1 for Application No. 2011374897, dated Sep. 9, 2016, 3 pages, Australia.
Taiwan Intellectual Property Office, TW Notice of Allowance for Application No. 105101130, dated Jun. 16, 2016, pp. 1-2, Taiwan.
State Intellectual Property Office of the People's Republic of China, Author unknown, CN Notification to Grant Patent Right for Invention for Application No. 201210317710.8, dated Jun. 8, 2016, pp. 1-2, China.
Federal Service for Intellectual Property, Patents and Trademarks (Russian Federation), Attorney Yury D. Kuznetsov, RU Decision on Grant Patent for Invention for Application No. 2014107726, dated May 16, 2016, pp. 1-6, Russia.
Federal Service for Intellectual Property, Patents and Trademarks (Russian Federation), Attorney Yury D. Kuznetsov, RU Official Action for Application No. 2014107726, dated Oct. 27, 2015, p. 1, Russia.
State Intellectual Property Office of the People's Republic of China, Author unknown, CN First Office Action for Application No. 201180072813.6, dated Apr. 29, 2016, pp. 1-9, China.
Federal Service for Intellectual Property, Patents and Trademarks (Russian Federation), Attorney Yury D. Kuznetsov, RU Notification for Application No. 2014104582, dated Oct. 19, 2015, pp. 1-3, Russia.
"OpenAPI Specification Version 2.0", Retrieved from: https://swagger.io/specification/v2/, Sep. 8, 2014, 45 Pages.
"Office Action Issued in European Patent Application No. 15787794.5", dated May 7, 2019, 12 Pages.
"Office Action Issued in Brazilian Patent Application No. 112014003123-1", dated Oct. 11, 2019, 5 Pages.
"Office Action Issued in Brazilian Patent Application No. 112014004469-4", dated Oct. 11, 2019, 5 Pages.
"First Office Action and Search Report Issued in Chinese Patent Application No. 201580055961.5", dated May 31, 2019, 19 Pages.
"Office Action Issued in Korean Patent Application No. 10-2014-7003539", dated Jan. 31, 2017, 7 Pages.
"Office Action Issued in Korean Patent Application No. 10-2014-7005283", dated Nov. 21, 2017, 11 Pages.
"Search Report And Office Action Issued in Taiwan Patent Application No. 104140190", dated Aug. 29, 2016, 9 Pages.
"Office Action Issued in European Patent Application No. 11871395.7", dated Feb. 16, 2017, 4 Pages.
"Office Action Issued in European Patent Application No. 11871395.7", dated Dec. 14, 2017, 8 Pages.
"Office Action Issued in Australian Patent Application No. 2017200899", dated Nov. 9, 2017, 2 Pages.
"Office Action Issued in Canadian Patent Application No. 2844492", dated Aug. 18, 2017, 3 Pages.
Foley, Mary JO., "Under the Windows 8 hood: Questions and answers from the trenches", Retrived From: https://www.zdnet.com/article/under-the-windows-8-hood-questions-and-answers-from-the-trenches/, Jun. 20, 2011, 9 Pages.
"Office Action Issued in Mexican Patent Application No. MX/a/2016/007659", dated Oct. 20, 2016, 3 Pages.
"Office Action Issued in Mexican Patent Application No. MX/a/2016/007659", dated Jun. 5, 2017, 5 Pages.
"Office Action Issued in Mexican Patent Application No. MX/a/2016/007659", dated Jan. 29, 2018, 6 Pages.
"Office Action Issued in Mexican Patent Application No. MX/a/2016/007659", dated Aug. 16, 2018, 1 Page, translation only.

(56) References Cited

OTHER PUBLICATIONS

Pietrek, Matt, "Featured 1 Microsoft.NET lengthen Downy and Part II: Microsoft. NET Framework of application meta- data", In msdn Magazine, Japan , ASCII Corporation, vol. 18, Issue 8, ISBN4-7561-362, Nov. 2000, pp. 2-18E.

"Second Office Action Issued in Chinese Patent Application No. 201580055961.5", dated Dec. 9, 2019, 37 Pages.

"Office Action Issued in Indian Patent Application No. 797/CHENP/2014", dated Dec. 18, 2019, 7 Pages.

* cited by examiner

API VERSIONING INDEPENDENT OF PRODUCT RELEASES

BACKGROUND

Conventionally, legacy platforms tend to be monolithic groupings of functionality. That is, a platform typically exposes the entirety of its functionality via its monolithic platform API. Applications make use of this API to operate on the platform.

Such a legacy platform tends to be versioned as a whole as it changes over time. Newer versions of the platform may or may not be a superset of older versions. That is, newer versions may or may not support all of the same functionality as older versions and, if they do, may not support the functionality in the same way. Thus, in order to guarantee proper operation, conventional applications must be explicitly developed to function on certain versions of a platform. In such cases, the decision as to which platforms an application will support must be made at development time (when the application is being created) as opposed to at run-time (when the application is executing). As a result, applications designed and implemented for legacy platforms are tied to those platforms and will likely fail to operate properly on other platforms or platform versions.

SUMMARY

The summary provided in this section summarizes one or more partial or complete example embodiments of the invention in order to provide a basic high-level understanding to the reader. This summary is not an extensive description of the invention and it may not identify key elements or aspects of the invention, or delineate the scope of the invention. Its sole purpose is to present various aspects of the invention in a simplified form as a prelude to the detailed description provided below. The invention as a whole shall not be limited to any particular embodiment(s) or example(s) or combination(s) therefore provided herein.

The invention encompasses technologies for a contract platform versioned according to the set of API contracts provided. API contracts are both development-time and run-time executable components. Each such contract defines a particular set of APIs that are fully supported at run-time by a corresponding implementation module. Contract applications are written to API contracts as opposed to the monolithic APIs of a legacy platform. Such applications are "platform agnostic". The term "contract application" or the like as used herein refers to any entity, including software, which programmatically access or utilizes features defined by one or more API contracts.

Many of the attendant features will be more readily appreciated as the same become better understood by reference to the detailed description provided below in connection with the accompanying drawings.

DESCRIPTION OF THE DRAWINGS

The detailed description provided below will be better understood when considered in connection with the accompanying drawings, where:

FIG. 6 is a block diagram showing an example method for responding, by an API contract, to availability queries and the like.

FIG. 7 is a block diagram showing an example method for responding, by a contract platform, to contract availability queries and the like.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the invention, but is not intended to describe all possible embodiments of the invention. This detailed description sets forth various examples of at least some of the technologies, systems, and/or methods invention. However, the same or equivalent technologies, systems, and/or methods may be realized according to examples as well.

Computing Environments

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
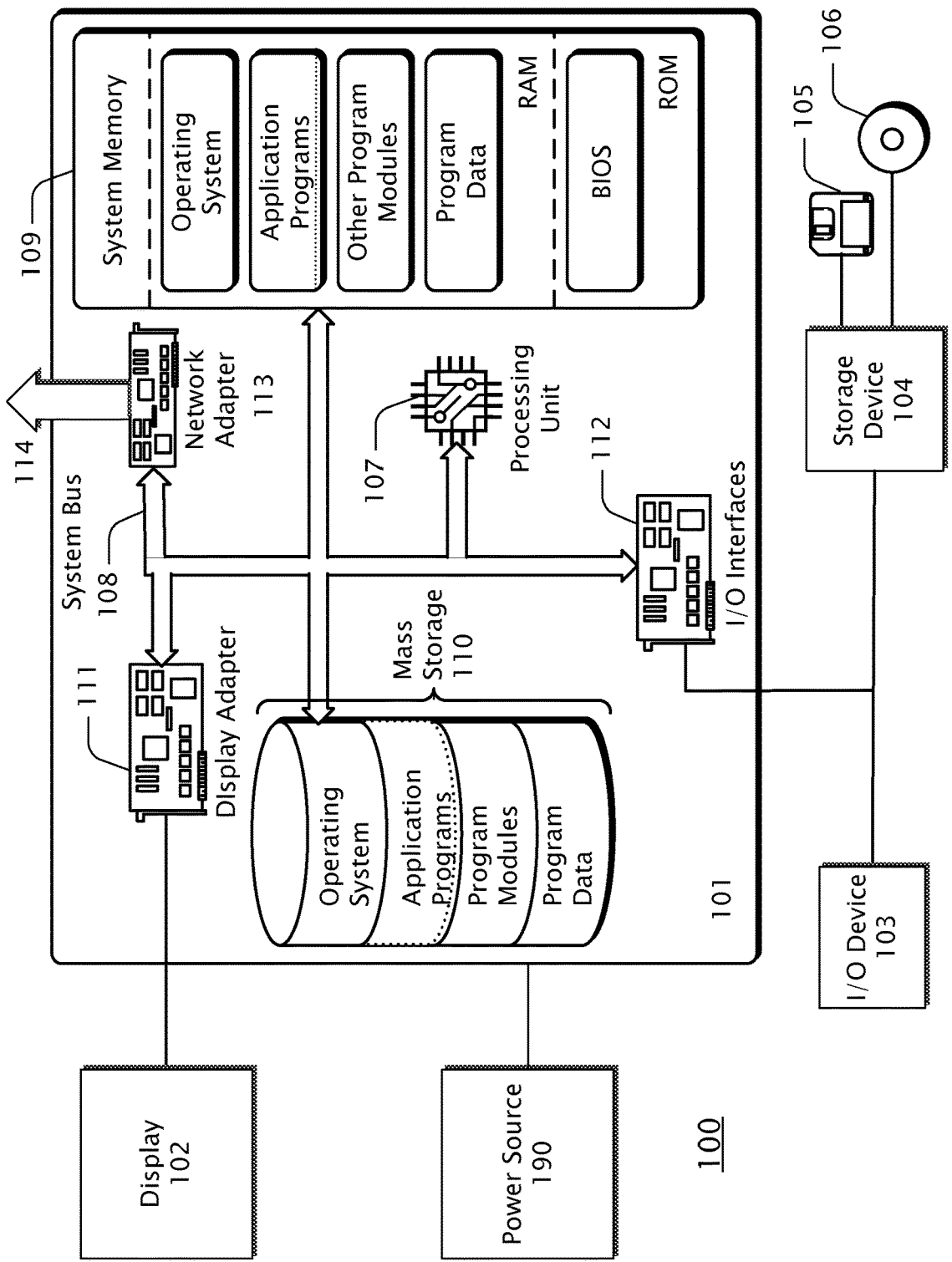
FIG. 1 is a block diagram showing an example computing environment in which the invention described herein may be implemented.

FIG. 1 is a block diagram showing an example computing environment 100 in which the invention described herein may be implemented. A suitable computing environment may be implemented with any of numerous general purpose or special purpose devices and/or systems. Examples of well-known device/systems include, but are not limited to, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes a general-purpose computing system in the form of a computing device 101 coupled to various components, such as peripheral devices 102, 103, 101 and the like. These may include components such as input devices 103 such as voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101.

This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like. The term "computing device" as used herein, unless preceded with the word "virtual", refers strictly to an article(s) of manufacture and the like. The terms "virtual computing device" and "virtual machine" typically refer to an emulation of a particular computing system and are commonly referred to as a virtual machine ("VM"). Such VMs, to be operational, are always hosted on a non-virtual computing device(s).

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107. The term "system memory" as used herein refers strictly to an article(s) of manufacture and the like.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like. The term "mass storage device" as used herein refers strictly to an article(s) of manufacture and the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor(s) 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may include only a few of the components described in connection with FIG. 1. For example, an electronic badge may be comprised of a coil of wire or the like along with a simple processing unit 107 or the like, the coil configured to act as power source 190 when in proximity to a card reader device or the like. Such a coil may also be configured to act as an antenna coupled to the processing unit 107 or the like, the coil antenna capable of radiating/receiving communications between the electronic badge and another device such as a card reader device. Such communications may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic device such as a ROM. The term "software" generally refers to computer-executable instructions, code, data, applications, programs, program modules, or the like maintained in or on any form or type of computer-readable media that is configured for storing computer-executable instructions or the like in a manner that is accessible to a computing device. The term "computer-readable media" and the like as used herein is limited to referring strictly to one or more statutory apparatus, article of manufacture, or the like that is not a signal or carrier wave per se. The term "computing device" as used in the claims is limited to referring strictly to one or more statutory apparatus, article of manufacture, or the like that is not a signal or carrier wave per se, such as computing device 101 that encompasses client devices, mobile devices, one or more servers, network services such as an Internet services or corporate network services based on one or more computers, and the like, and/or any combination thereof.

Legacy Platforms

Figure 2:
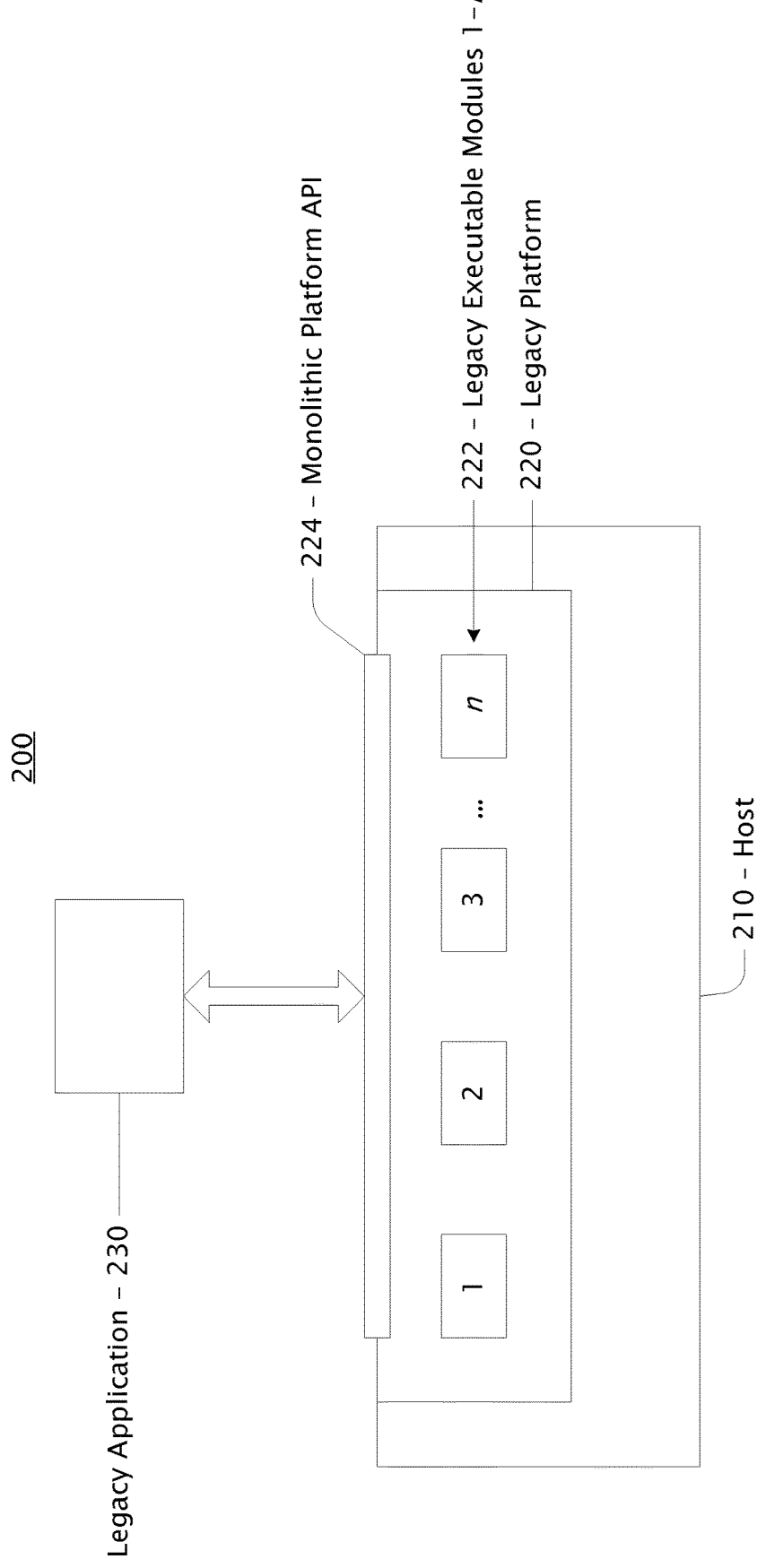
FIG. 2 is a block diagram showing an example system configured for providing a legacy platform.

FIG. 2 is a block diagram showing an example system 200 configured for providing a legacy platform, such as legacy platform 220, that includes a monolithic application programming interface ("API"), such as example platform API 224, and its underlying executable modules, such as example platform executable modules 1-n 222, as resources for one or more applications, such as example application 230.

Conventionally, legacy platforms tend to be monolithic groupings of functionality. That is, a platform typically exposes the entirety of its functionality via its monolithic platform API. Applications make use of this API to operate on the platform. One example of a legacy platform is a conventional operating system. Another example of a legacy platform is code library or the like.

Such a legacy platform tends to be versioned as a whole as it changes over time. Newer versions of the platform may or may not be a superset of older versions. That is, newer versions may or may not support all of the same functionality as older versions and, if they do, may not support the functionality in the same way. Thus, in order to guarantee proper operation, conventional applications must be explicitly developed to function on certain versions of a platform. In such cases, the decision as to which platforms an application will support must be made at development time (when the application is being created) as opposed to at run-time (when the application is executing). As a result, applications designed and implemented for legacy platforms are tied to those platforms and will likely fail to operate properly on other platforms or platform versions.

Regarding monolithic platform API 224, some legacy platforms may provide a run-time mechanism(s) to determine if a particular interface is available, such as to read from a file or to write to a file. But "features" as defined by API contracts are unknown to legacy platforms. Thus, legacy platforms provide no mechanism to test for the presence of a particular feature, such as a feature defined by an API contract. Even if one were to define a legacy feature and identify the collection of APIs that make up the legacy feature, one is still left to test for the run-time presence of each of those APIs individually as there is not mechanism to test for the legacy feature as a whole.

FIG. 2 illustrates an example host 210 that may be any kind of computing device(s). Host 210 typically includes a legacy platform 220 sufficient to enable applications, such as example application 230, to operate on host 210. One example of a platform is an operating system, such as Apple iOS, Microsoft Windows, Microsoft Windows Phone, Xbox, Android, Linux, etc. Each such platform typically exposes an API, such as platform API 224. For any particular platform, this API may change as the version of the platform changes. Newer versions of an API may be, and often are, incompatible with older versions. Examples of host 210 include computing devices such as servers, desktops, laptops, tablets, cell phones, and any other computing device, entity comprising a computing device, and/or collection of such computing devices.

The actual functionality of a platform is typically provided by one or more executable modules of the platform, such as platform executable modules 1-n 222. For example, when application 230 calls a particular platform API, that call is handled by the corresponding executable module.

Conventionally, a platform exposes its entire platform API which makes available to application developers the entirety of the platform's functionality. In essence, from an application development viewpoint, a platform and its API are defined in their entirety by the specific version of the platform. This results in a challenging problem for the application developer. That is, the developer of an application must decide at the time of development that his application will support version x of a particular platform and, by so doing, assumes that all of the platform API (and the corresponding functionality) of version x of the platform will be available to his application. By making a decision to support version x of a platform, the developer knows that his application may not operate properly on version y of the platform (whether version y is greater or less than version x), unless the vendor of the platform, as a matter of policy, decides to guarantee that version y will be fully compatible with version x.

Because application development is expensive, this current state of the art often forces application developers to choose between two important markets: (1) create applications for older platforms that have more users but older and fewer features or (2) create applications for newer platforms that have more and newer features but fewer users.

Further, platform vendors may provide different variations of the same platform for different device classes. For example, Microsoft Corporation offers Microsoft Windows for generic computing devices, Microsoft Windows Phone for cell phones and the like, and Xbox. Each of these variations exposes a similar but different API and are each versioned separately from each other. Such variations of a platform further complicate the decision a developer must make as he must now decide not only which versions of a platform to support, but also which versions of which variations of the platform, thus multiplying the problem for developers.

The terms "platform" and "legacy platform" as used with respect to FIG. 2 refers to a conventional or legacy platform.

The terms "platform" and "contract platform" as used with respect to the remainder of the figures refers to a novel and unique platform of the present invention that is not a legacy platform, but that is a contract platform.

Contract Platforms

Figure 3:
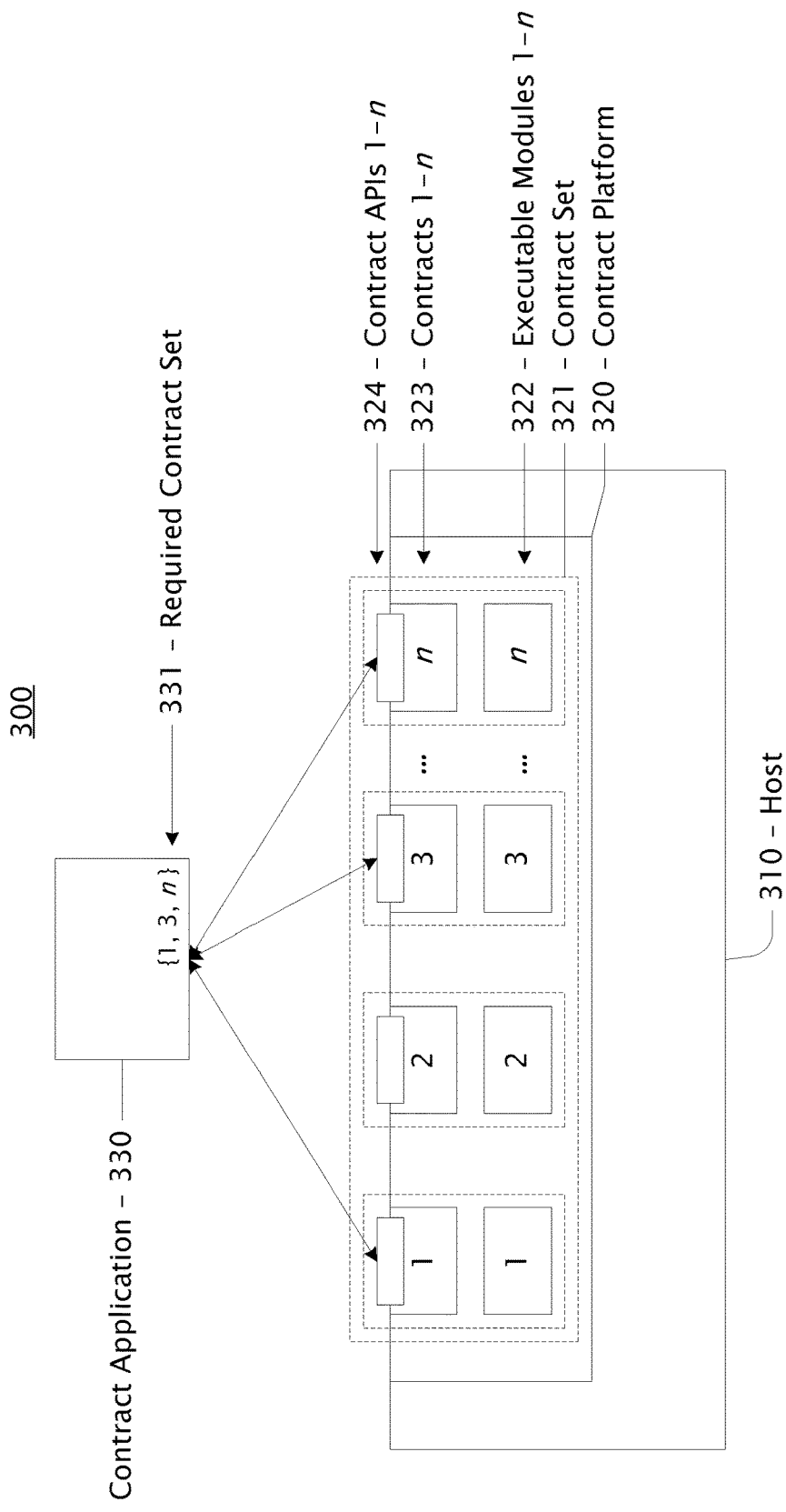
FIG. 3 is a block diagram showing an example system configured for providing a contract platform.

FIG. 3 is a block diagram showing an example system 300 configured for providing a contract platform, such as example contract platform 320, that includes a particular set of API contracts, such as example contracts 1-*n* 323 in example contract set 321, the APIs these contracts define, such as contract APIs 1-*n* 324, and their underlying executable modules, such as example contract executable modules 1-*n* 322. Example host 310 may be any kind of computing device(s) but, in this example, provides a contract platform 320 that, instead of providing one monolithic platform API, hosts a set of contracts 321 where each contract exposes its own API, such as the API 324 for contract 1, and is associated with its corresponding executable module, such as contract execution module 1 for contract 1. One example of a contract platform is an operating system that is based on a collection of one or more sets of API contracts.

Applications designed to operate on contract platforms, such as example application 330, typically include an indication of the set of contracts they require to operate, such as indication 331. As a result, such an application does not depend on any particular platform(s) but requires a particular set of contracts instead. Thus the application is "platform agnostic" and is able to operate on any platform that provides the required contracts, which typically represent a significantly smaller set of functionality than a monolithic platform API.

The use of contracts greatly reduces the developer problem discussed above. For example, by developing an application that requires specific contracts instead of developing the application for a particular platform, the application is able to operate on any platform, any variation of a particular platform, and any version of a particular platform that provides the required contracts, either presently or in the future. This includes presently unknown platforms such as future platforms and platforms converted or developed for new devices.

The terms "provided contract set" or the like as used herein refer to a set of contracts provided by a particular platform. The terms "required contract set" or the like as used herein refer to a set of contracts required by a particular application. In general, for a particular application to operate on a particular contract platform, the provided set of contracts must include the required set of contracts.

API Contracts

Figure 4:
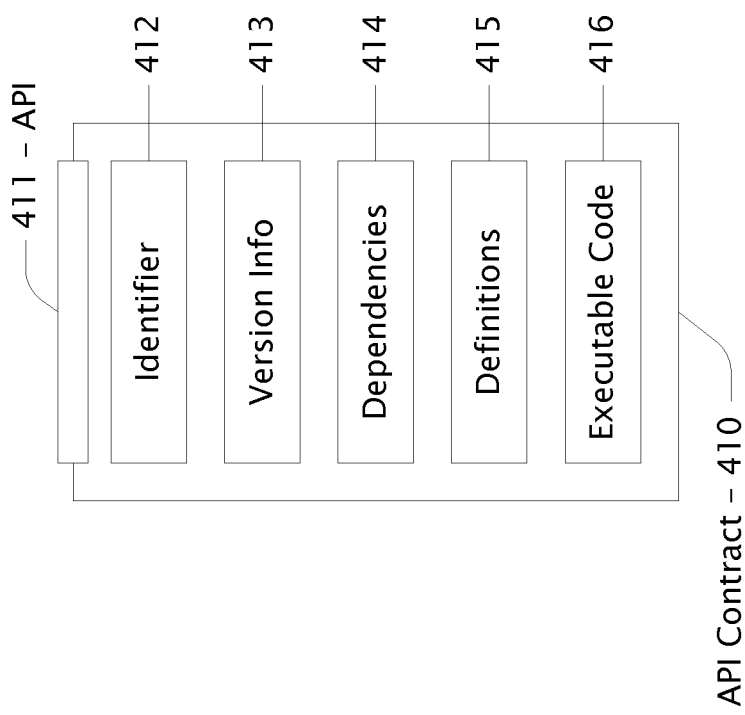
FIG. 4 is a block diagram showing an example illustration of an API contract.

FIG. 4 is a block diagram showing an example illustration of an API contract 410. An API contract is both a development-time and a run-time executable component that defines a particular set of APIs that are fully supported at run-time by a corresponding contract implementation module(s). A contract typically exposes an API 411 that enables applications and the like to access and utilize the functionality provided by the contract. In one example, an API contract may verify the presence and version of its implementation module(s). In another example, the declarations of an API contract are built with its executable module(s).

A contract typically also includes identification information 412. Such identification information may be in the form of an identifier that is unique among API contracts in a particular namespace. In one example, the identification information is implemented as a unique name. Alternatively, this identifier may be implemented in other forms, such as a unique identification number or the like. In one example, identification information 412 is an attribute(s) of contract 410. This attribute(s) may be accessible via API 411 and/or executable code 416. A unique identifier may be a universally unique identifier ("UUID").

A contract also typically includes version information 413. Such version information may numerical in value so as to imply order. In one example, this version information includes a current version of the contract itself. The version information 413 may be an attribute(s) of contract 410. This attribute(s) may be accessible via API 411 and/or executable code 416. Additional detail regarding versioning information 413 is provided below in the VERSIONING OF API CONTRACT section.

A contract also typically includes dependency information 414. In one example, such dependency information indicates any contract dependencies had by contract 410. That is, any reference in contract 410 to another contract constitutes a contract dependency. In one example, such a reference is from a type in contract 410 to a type in another contract. All such contract dependencies are typically included in dependency information 414. Such information may be used to determine any contract dependencies had by contract 410 such that, when loading contract 410, the contracts depended upon can also be loaded. In one example, dependency information 414 is an attribute(s) of contract 410. This attribute(s) may be accessible via API 411 and/or executable code 416.

A contract also typically includes definition information 415. In one example, such definition information 415 defines the feature(s) of contract 410 in the form of types (i.e., run-time classes, methods, structures, interfaces, enumerations, and the like), where the feature(s) is generally implemented by an executable module associated with the contract. In one example, definition information 415 is an attribute(s) of contract 410. This attribute(s) may be accessible via API 411 and/or executable code 416.

A contract also typically includes executable code 416. In one example this is the executable code that enables contract 410 to respond to queries and the like. Various attributes of a contract may be accessible via its executable code 416, such as via API 411.

Each API contract generally exhibits the following characteristics:

A contract defines a particular feature. Each contract generally defines an API set for a particular feature(s), and thereby defines the feature. The term "feature" as used herein generally refers to an ability that is programmatically provided by the contract to an application or the like such as, for example, file manipulation, networking, printing, displaying, speech recognition, geolocation, etc. The feature(s) may be provided as some combination of programming constructs such as APIs, objects, types, structures, enumerations, classes, methods, procedures, protocols, etc. For example, a file manipulation feature may be provided as APIs for opening, closing, reading, and writing files.

A contract is implemented in its entirety or not at all. In order to insure that required functionality is available, a contract for a particular feature is implemented in its entirety. That is, the API set for a particular feature is defined by the contract and the functionality for the API set is fully implemented by the corresponding contract implementation module. In this manner, any application that requires a particular contract can deterministically expect that its feature will operate as expected.

A contract is additively versioned. Each newer version of a particular contract can add to the previous version of the contract, but the newer version continues to define every-thing defined in the previous version. In this manner, any application that requires a particular version of a particular contract can deterministically expect that its feature will operate as expected with that or any newer version. Further, if version 5 of a contract is present on a platform, for example, then versions 1 through 4 (all previous versions) and their executable module(s) (one or more) are also present as a result of the additive versioning characteristic.

A contract is discoverable at run-time. An application can query to determine if the contract(s) it requires is available. Because a contract is a run-time component, it is able to be discovered at run-time and to provide information about itself, such as its version, the API set it defines, etc. As a result, an application can be developed to require at least version 1 of a contract at development time, but also to determine if version 3 is available at run-time and, if so, to make use of it and any additional features when it is available.

A contract is discoverable at development-time. A development tool, such as a compiler, development environment, or the like, can query to determine if the contract(s) implied by and/or indicated in source code is available. In one example, the contract(s) are indicated based on types, structures, APIs, and/or other constructs referenced in the source code. Because a contract is a development-time component, it is able to be discovered by development tools and to provide information about itself, such as its version, the API set it defines, etc. As a result, development tools are able to verify, in real-time, whether or not the required contract(s) include that APIs that are referenced in the source code being developed.

A contract may depend on another contract. A contract may optionally have a dependency on another contract(s). In one example, such a dependency may exist due to a type in the first contract referencing a type in the second contract. As a result, a set of contracts form a directed dependency graph. In one example, such a directed dependency graph may be required to avoid cycles. In another example, it may be permissible for contract 'A' to depend on contract 'B' and, at the same time, for contract 'B' to depend on contract 'A'.

A contract is defined by the functionality it provides. For example, given FileManipContract v2, this contract is defined by the APIs, types, objects, etc., which it provides to applications. Therefore, every FileManipContract v2 contract, regardless of the platform/device combination for which it is implemented, provides the identical functionality from the perspective of applications. In this manner, applications are able to depend on particular contracts and thus become platform agnostic. That is, an application that requires FileManipContract v2 will, by definition, operate properly on any platform/device combination that provides a FileManipContract v2 contract. The particular platform and device are irrelevant, so long as they provide FileManipContract v2. Thus, the application will operate properly on all servers, services, desktops, mainframes, cell phones, tablets, pads, toasters, coffee machines, cars, super computers, and on any other platform/device combination so long as the combination provides the FileManipContract v2 contract. This concept is embodied by the term "platform agnostic" as used herein and indicates an operational dependency between a contract application and a contract but not between the application and a platform/device combination as is the case with conventional applications.

The terms "API contract" and "contract" as used herein generally refer to the same thing. The term "development time" as used herein refers to the time at which code or the like is being assembled, compiled, linked, and the like during development of the code in order to produce an application of the like. The term "run-time" as used herein refers to the time at which an application is running (executing), such as on a platform.

Application Run-Time Usage of API Contracts

Contract applications are able to indicate the minimum functionality that a platform must provide in order for the application to function properly at a minimum level. In one example, this is done by the application indicating its required contract set as opposed to requiring particular platforms or platform versions. For example, a contract application can operate on any platform or platform version as long as it includes the required contract set and regardless of the particular device or device type on which the application and platform are operating. In this manner, contract applications specify a required contract set that is determined at run-time and, by so doing, such an application essentially becomes "platform agnostic". That is, a contract application can run on any platform and any version of that platform so long as it includes the contract set required by the application.

Further, beyond operating at a minimum level, a contract application can also discover optional contracts at run-time as well. And because a contract generally defines a particular feature, this means that a contact application can easily test at run-time for the presence of the particular feature on whatever platform it is currently running. This ability to query for optional contracts or features at run-time enables applications to easily determine what functionality to offer at run-time as opposed having their scope of functionality fixed at development-time as with conventional applications. Thus, the more functionality made available by a particular platform via available contracts, the more functionality that a contract application is able to discover at run-time, utilize, and expose.

Figure 5:
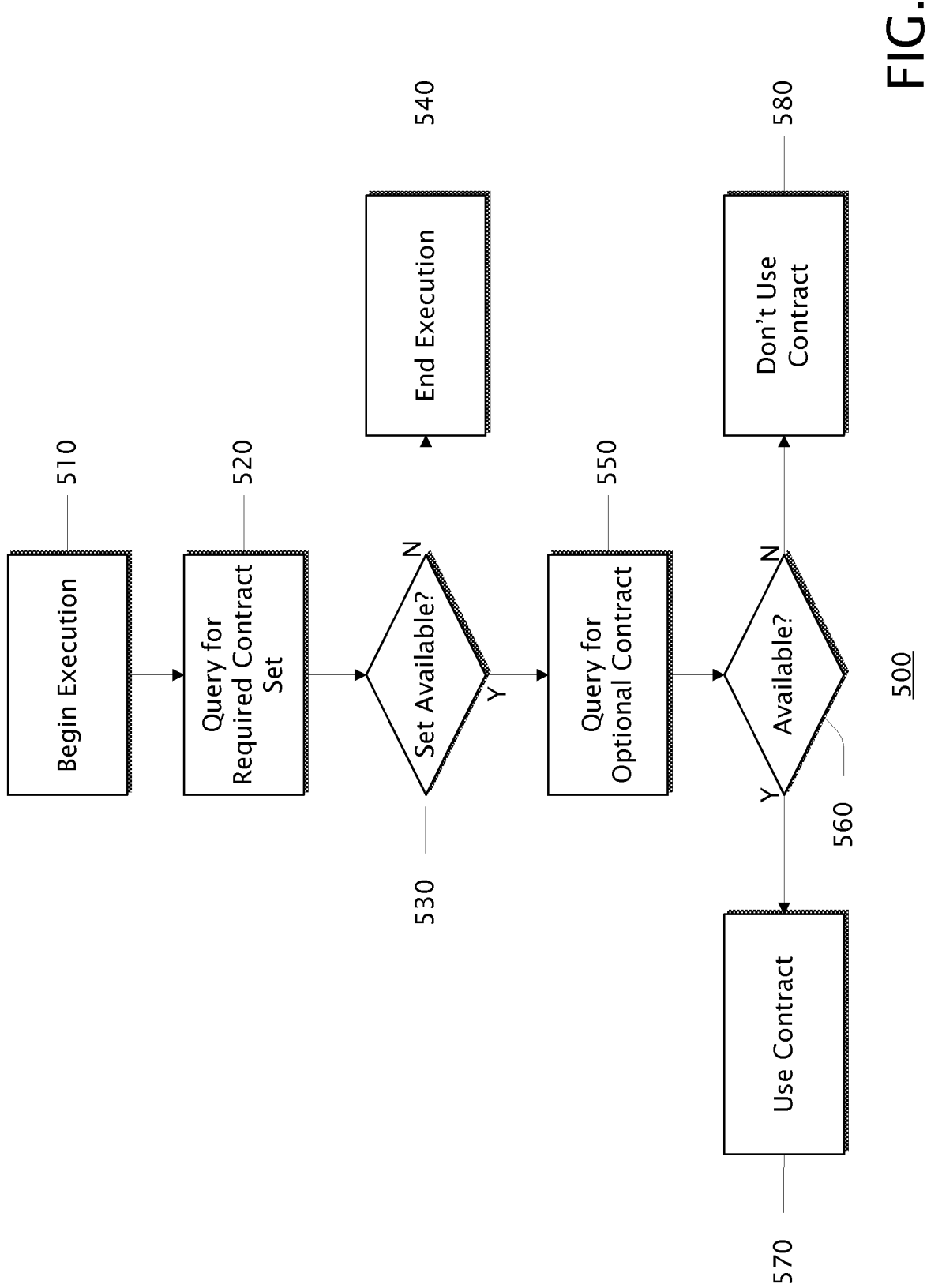
FIG. 5 is a block diagram showing an example method for determining availability of API contracts at run-time.

FIG. 5 is a block diagram showing an example method 500 for determining availability of API contracts at run-time. In general, the availability of a contract and its corresponding executable module can be determined programmatically at run-time. Any application, platform, or other entity can perform a run-time query to determine availability of a contract in a given environment. In one example, such a query may be performed as follows.

Block 510 typically indicates a contract application (or platform or other entity) beginning execution, such as in any conventional manner. In one example, the application begins execution on a particular platform and device, such as on a particular computer (the device) running a particular contract-based operating system (the platform). Once executing, method 500 typically continues at block 520.

Block 520 typically indicates the executing application querying for its required contract set. Such a required contract set typically includes at least one required API contract. The query may be made to the platform or to any other entity that can respond to a query regarding the contracts available on the particular platform. The query may be made in the form of an API call, a discovery protocol, or any other supported form. A single query may be made for the entire contract set (i.e., all contracts in the set), or multiple queries may be made, each for a subset of the set. Such a query typically includes a name, identifier, or the like, of the contract(s) in the required contract set. Further, a query may include a version number for the contract(s). In one example, such a version number is a minimum acceptable version number. Once the application has queried, method 500 typically continue at block 530.

Block 530 typically indicates the queried entity determining if the indicated contract(s) or contract set is available. In one example, such determining includes verifying that a name/identifier and version of an available contact matches a name/identifier and version specified in the query. In one example, matching the version means the available version is the same as the version specified in the query. In another example, matching the version means the available version is the same as or newer than the version specified in the query. In yet another example, the query further indicates whether an exact match or a same-or-newer match is required. If it is determined that a contact(s) matching that (those) specified in the query is (are) available, then an indication in the positive is typically provided to the querying entity (not shown) and method 500 typically continues at block 550. Otherwise, an indication in the negative is typically provided to the querying entity (not shown) and method 500 typically continues at block 540.

In providing an indication in the positive, the available version(s) of each contract specified in the query may also be provided. In providing an indication in the negative, the available version(s) (if any) of each contract specified in the query may also be provided, and any specified contracts that are not available in any version may also be indicated.

Block 540 typically indicates the application ending execution in response to an indication in the negative that means at least one of the contracts in the required contract set is not available. In general, when any of an application's required contracts is unavailable, then the application is unable to operate properly and is therefore terminated. For a specified contract to be unavailable typically means that no available version matches that of the specified contract, or that the specified contract is available in any version.

Block 550 typically indicates an application querying for an optional contract(s). In one example, an application typically operates as expected without the optional contract, but may be capable of providing enhanced or additional functionality if the optional contract is available. For example, an optional contract may be a newer version of a required contract that provide newer functionality, or may provide optional additional functionality. A query for an optional contract may occur at any point during execution of the application including, for example, proximate step 520. Once the application has queried, method 500 typically continue at block 560.

Block 560 typically indicates the queried entity determining if the indicated contract(s) is available. In one example, such determining includes verifying that a version of an available contact matches a version specified in the query, as in step 530. If it is determined that a contact(s) matching that (those) specified in the query is (are) available, then an indication in the positive, as in step 530, is typically provided to the querying entity and method 500 typically continues at block 570. Otherwise, an indication in the negative, as in step 530, is typically provided to the querying entity and method 500 typically continues at block 580.

Block 570 typically indicates the application being able to use functionality provided by an available optional contract in response to the indication in the positive that means the optional contract is available. In general, when an optional contract is available, then the application is able to make use of any functionality provided by that contract.

Block 580 typically indicates the application not attempting to use functionality provided by an unavailable optional contract in response to the indication in the negative that means the optional contract is not available. In general, when an optional contract is unavailable, then the application is unable to make use of any functionality provided by that contract.

Development-Time Usage of API Contracts

Development-time usage of API contracts may provide for an improved developer experience. This is because development environments are able to query API contracts in the same manner as any other application, such as described above. Contemporary development environments typically combine source code editors, compilers, debuggers, and the like into a single, integrated development environment (individually and collectively referred to herein as "tooling"). Such tooling may be enhanced to become aware of API contracts, thus enabling significant enhancements to the conventional developer experience. In particular, such tooling is typically able to compile contract applications so long as the required API contracts are available in the development environment (where the corresponding executable modules are not required for compiling), while debugging and execution of the compiled contract applications typically require both the API contracts and the corresponding executable modules to be present in the target environment (the environment in which the compiled contract application is intended to be debugged and/or executed).

In some scenarios, tooling is used by developers on platforms that are different than the target platform(s) for which a contract application is being developed. In this situation, the development platform may provide API contracts that are different than those that will ultimately be required by the contract application on the target platform.

In general, the source code for a contract application includes a reference(s) that implies and/or indicates each contract and its minimum version required by the application, where the collection of each of these required contracts comprises the application's required contract set. In one example, such a reference is nothing more than a reference in the source code to some construct such as a type, structure, method, API, or the like. In this example, the tooling infers the specific contract that provides each referenced construct. In another example, a required contract is explicitly indicated in the source code. In yet another example, any combination of contract inference and indication is supported. These references enable the development environment to indicate in the source code editing environment which of the required contracts are present in the development environment and which are not. Further, indications can also be provided for API references in the source code, such as static API references, thus indicating whether or not the referenced API is supported by the required contract set, by which contract in the set, by what versions of the contract, etc. In this manner, a developer can quickly see while editing the source code whether the APIs being used are supported by the required contract set.

Generally, Each API contract comprises executable code that enables other entities to programmatically discover its existence, to query its attributes, and to enumerate the APIs, types, objects, and the like that it defines. This is one way in which an API contract differs from a conventional header file and the like that is nothing more than a passive text file that does not include executable code. Further, a contract platform (and its software development kit ("SDK")) typically includes metadata that describes each API contract included as part of the platform. A discovery contract may also be provided that accesses the metadata in response to discovery queries via its API by contract applications and the like. Thus the availability of an API contract is typically discoverable directly (via its API) and/or via a discovery contract and metadata provided by a platform that includes the API contract.

Figure 6:
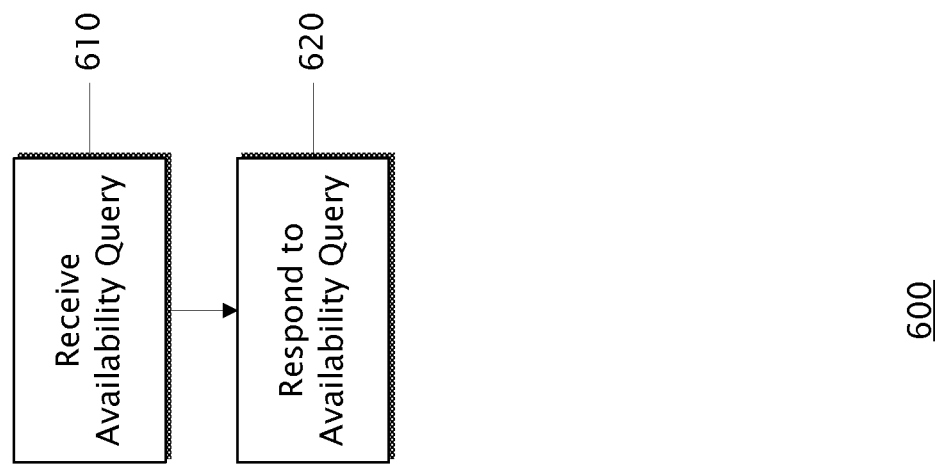

FIG. 6 is a block diagram showing an example method 600 for responding, by an API contract, to availability queries and the like. Block 610 of typically indicates a contract programmatically receiving an availability query. Any development environment, application, platform, or other entity can perform a run-time query to determine availability of a contract in a given environment, either the current executing environment or a desired target execution environment. The query may be received in the form of an API call, via a discovery protocol, or in any other supported form. Once such a query or the like is received, method 600 typically continues at block 620.

Block 620 typically indicates the receiving contract responding to the availability query. In one example, such a response is an indication in the positive. In another example, such a response includes information and/or attributes of the contract, such as its identifier, name, version, or the like. Further, depending on the exact nature of the availability query, or in response to a different query, a response may include information about the contract such as any combination of its attributes, the APIs, types, and objects it defines, and information about its executable module such as its identifier, name, version, location, or the like.

Platform Usage of API Contracts

A contract platform is generally defined by the contract set it provides. For example, a contract-based operating system exposes the functionality it offers via a provided contract set in contrast to a conventional operating system with its monolithic API. Conventionally, a particular version of a platform defines its monolithic API. But with a contract platform, the provided set of specific versions of contracts (the provided contract set) generally defines a particular version of that platform.

Further, multiple different platforms that are compatible with different devices may each provide a particular version of a particular contract. For example, each of the different platform/device combinations may provide v2 of a file manipulation contract. While the implementation modules corresponding to these contracts may be customized for compatibility with their respective platform/device combinations, each of these v2 file manipulation contracts provides identical file manipulation functionality from the perspective applications. Thus, contract platforms with their provided contract sets enable applications to be "platform agnostic".

Figure 7:
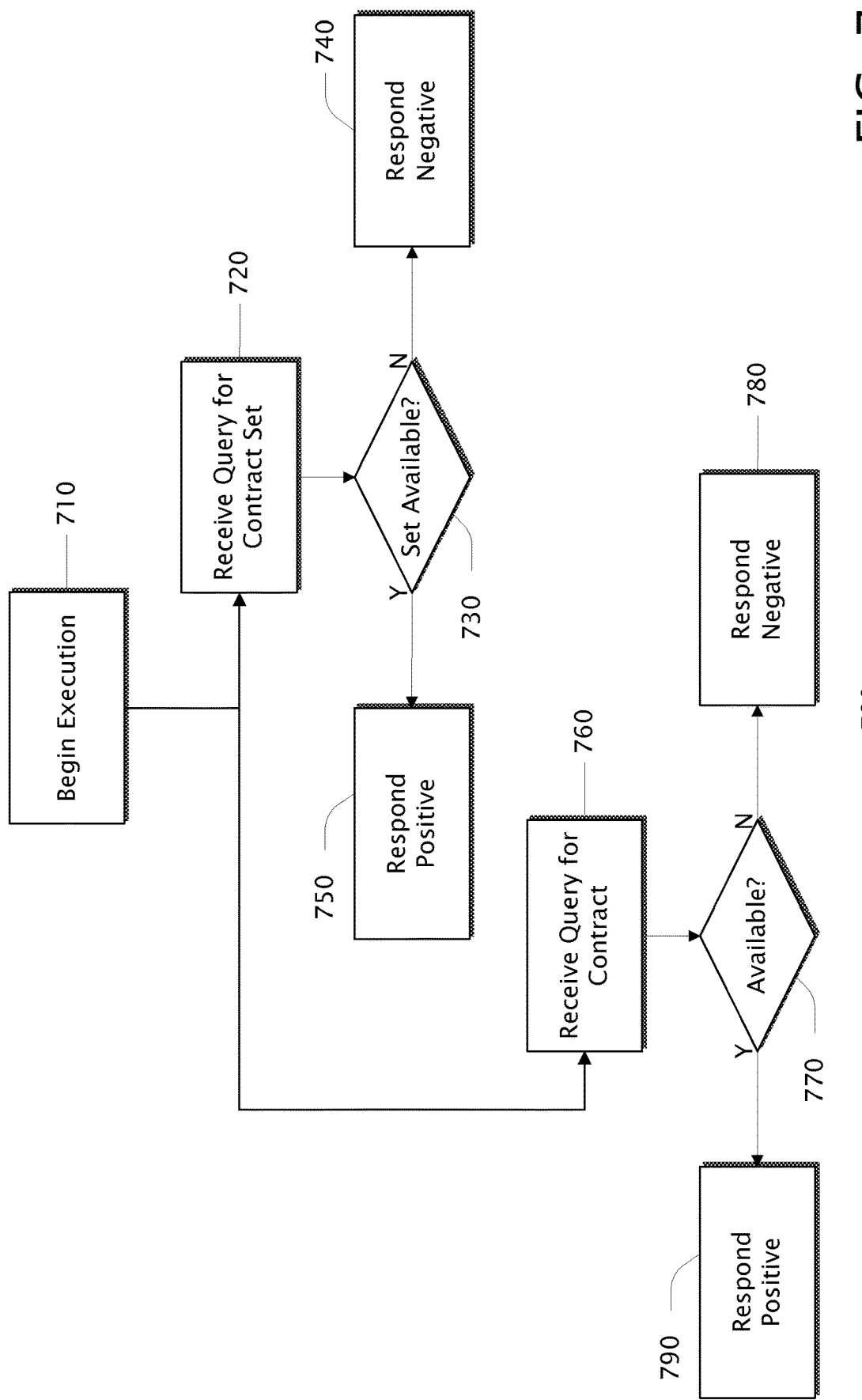

FIG. 7 is a block diagram showing an example method 700 for responding, by a contract platform, to contract availability queries and the like. In one example, a particular platform includes an enumeration of the contracts it provides. Such an enumeration may be provided in any suitable form sufficient to indicate the provided contract set, and may include passive forms such as a listing and/or active forms such as a discovery protocol and/or a callable API. Method 700 is an example of an active form.

Block 710 typically indicates a contract platform beginning execution, such as in any conventional manner. In one example, the contract platform may be a contract-based operating system booting on a computing device. Once the platform is executing, and at some point during execution of the platform, method 700 typically continues at block 720 or 760.

Block 720 typically indicates the platform receiving a query or the like for a particular contract set. The query may originate from an application, the platform itself, or from any other entity. The query may be made in the form of an API call, a discovery protocol, or any other supported form. A single query may be received for the entire contract set (i.e., all contracts in the set), or multiple queries may be received, each for a subset of the set. Such a query typically includes a name, identifier, or the like, of the contract(s) in the contract set. Further, the query may include a version number for each contract. In one example, such a version number is a minimum acceptable version number. Once the query is received, method 700 typically continues at block 720.

Block 730 typically indicates the platform determining if the particular contract set is available. In one example, such determining includes verifying that a name/identifier and version of an available contact matches a name/identifier and version specified in the query. In one example, matching the version means the available version is the same as the version specified in the query. In another example, matching the version means the available version is the same as or newer than the version specified in the query. In yet another example, the query further indicates whether an exact match or a same-or-newer match is required. If it is determined that a contact(s) matching that (those) specified in the query is (are) available, then an indication in the positive is typically provided to the querying entity as indicated by block 750. Otherwise, an indication in the negative is typically provided to the querying entity as indicated by block 740.

Block 760 typically indicates the platform receiving a query or the like for a particular contract. The query may originate from an application, the platform itself, or from any other entity. The query may be made in the form of an API call, a discovery protocol, or any other supported form. Such a query typically includes a name, identifier, or the like, of the contract. Further, the query may include a version number for the contract. In one example, such a version number is a minimum acceptable version number. Once the query is received, method 700 typically continues at block 770.

Block 770 typically indicates the platform determining if the particular contract is available. In one example, such determining includes verifying that a name/identifier and version of an available contact matches a name/identifier and version specified in the query. In one example, matching the version means the available version is the same as the version specified in the query. In another example, matching the version means the available version is the same as or newer than the version specified in the query. In yet another example, the query further indicates whether an exact match or a same-or-newer match is required. If it is determined that a contact matching that specified in the query is available, then an indication in the positive is typically provided to the querying entity as indicated by block 790. Otherwise, an indication in the negative is typically provided to the querying entity as indicated by block 780.

In providing an indication in the positive, as indicated by blocks 750 and 790, the available version(s) of each contract specified in the query may also be provided. In providing an indication in the negative, as indicated by blocks 740 and 780, the available version(s) (if any) of each contract specified in the query may also be provided, and any specified contracts that are not available in any version may also be indicated.

Shimmed Contract Platforms

Figure 8:
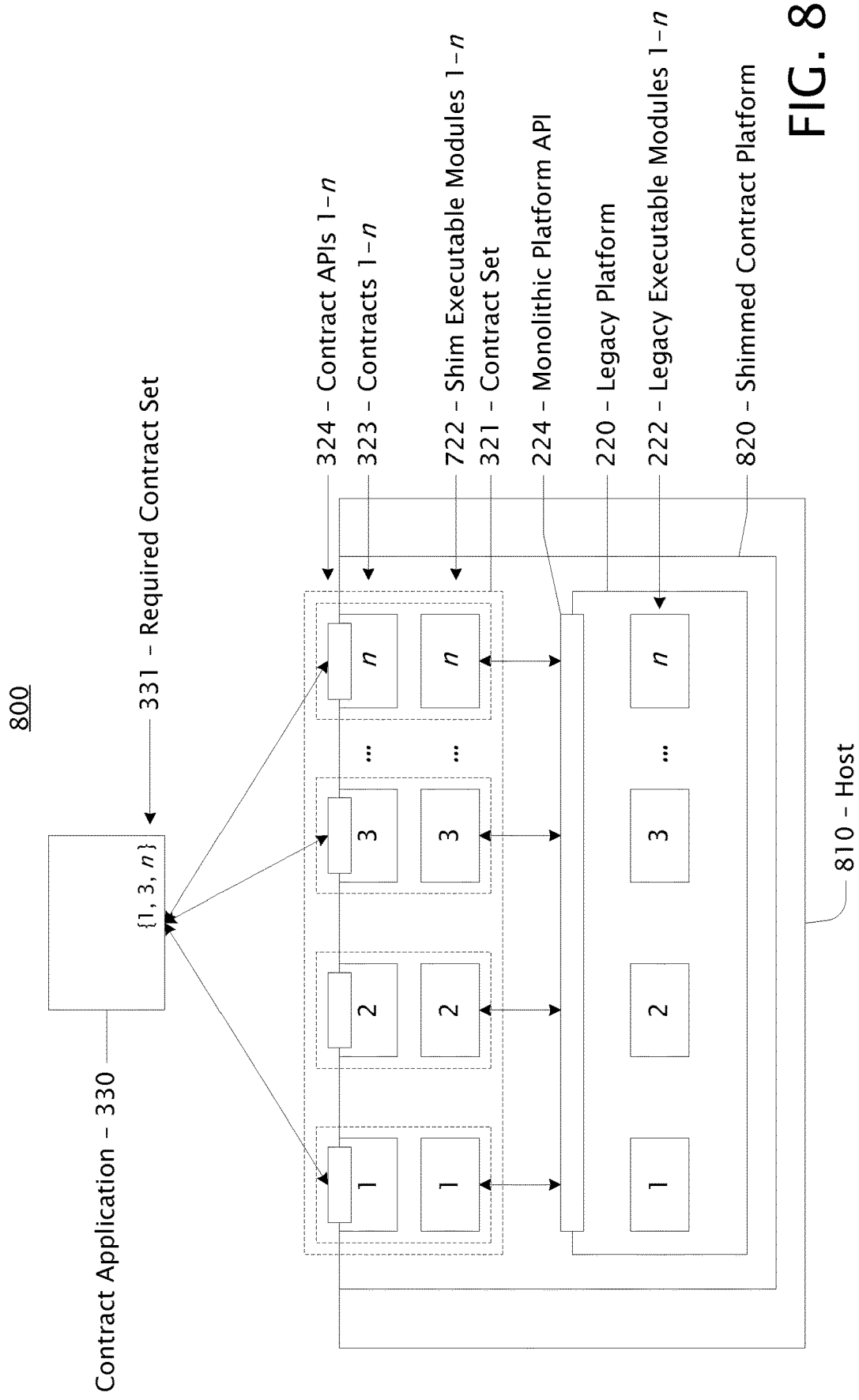
FIG. 8 is a block diagram showing an example system, similar to example system of FIG. 3, configured for providing a shimmed contract platform.

FIG. 8 is a block diagram showing an example system 800, similar to example system 300 of FIG. 3, configured for providing a shimmed contract platform, such as example shimmed contract platform 820, that includes a particular set of API contracts, such as example contracts 1-*n* 323 in example contract set 321, the APIs these contracts define, such as contract APIs 1-*n* 324, and their underlying executable modules, such as example contract executable modules 1-*n* 822. Example host 810 may be any kind of computing device(s) but, in this example, provides a shimmed contract platform 820 that, in addition to providing one monolithic platform API, such as API 224, includes a set of contracts 321 where each contract exposes its own API, such as the API 324 for contract 1, and is associated with its corresponding executable module, such as contract execution module 1 for contract 1.

In general, from the perspective of contract application 330 and the like, example platform 820 provides the same contract set, and thus the same functionality, as example platform 320 of FIG. 3. On the other hand, platform 800 includes a legacy platform 220 with its monolithic API 224, such as a conventional operating system, that is shimmed to contract set 321 by executable modules 822. In this manner, a legacy platform can be "upgraded" to support contract applications.

In particular, each contract that is to be provided by shimmed platform 820, such as contracts 1-*n* 323, includes an implementation module, such as implementation modules 1-*n* 822, that executably maps portions of the legacy platform's monolithic API 224 to the contract APIs 324 of the contracts being provided 323. For example, given FileManipContract v2, this contract is defined certain APIs, types, objects, etc., which it provides to applications. Therefore, every FileManipContract v2 contract, regardless of the platform/device combination it is implemented to support, provides the identical functionality from the perspective of applications. In another example, implementation modules 1-*n* 822 are configured to utilize various legacy executable modules 222 of the legacy platform 220 to perform legacy platform functionality. Such legacy executable modules may include executable code in the form of dynamic link libraries ("DLLs"), drivers, and other legacy program modules and the like. In such an example, it is very unlikely to have a one-to-one correspondence between shim executable modules 722 and legacy executable modules 222.

But in this example, the executable module for FileManipContract v2 simply maps the functionality defined by the contract to the functionality provided by the legacy platform's monolithic API 224. Thus, example application 330 is able to utilize the file manipulation functionality as defined by the provided FileManipContract v2 contract via the corresponding executable module. This is because such a shim executable module executably maps the file manipulation functionality as defined by the contract to/from the functionality provided by the legacy platform's monolithic AP 224. Thus, the legacy platform ultimately provides the functionality because the shim executable module executably maps that functionality to/from the functionality as defined by the contract. In this manner, contracts and shim executable modules can enable legacy platforms to support contract applications.

Versioning of API Contracts

In general, API contracts are versioned. In one example, a top-level contract type defines an API contract and has associated contract and current version attributes. In one example, the contract attribute identifies the API contract with which the contract type is associated, and the current version attribute identifies the current version of the API contract. In this example, and in general, the current version is greater than or equal to the version of all types associated with the contract.

Beyond the versioning of API contracts themselves, each element defined by a contract typically indicates the version at which it was added to the contract. For example:

```
[contract(Windows.FooContract, 3)]
runtimeclass Xyz
{
    [default]interFace IXyz;
    [contract(Windows.FooContract, 5)] intarface IXyz2;
}
```

The above pseudo code of example API contract Windows.FooContract defines run-time class Xyz that was added to the contract at version 3, and further defines the IXyz2 interface that was added to Xyz at version 5 of the contract. In this example, the current version of the contract would be at least version 5. In a similar example:

```
[contract(Windows.FooContract, 5)]
enum InterestingOddNumbers
{
    Three = 3,
    Five = 5,
    [contract(Windows.FooContract, 9)] Seven = 7
}
```

The above pseudo code illustrates example enumeration InterestingOddNumbers added to Windows.FooContract at version 5, with the Seven field added at version 9 of the contract. In this example, the current version of the contract would be at least version 9.

The following rules generally apply to the versioning of API contracts:

API contract are additively versioned. New types can be added to an API contract over time, types in the contract can be versioned, and types can be moved from one contract to another. But no type or aspect of a type can otherwise be removed from a contract. In a situation where a type is moved from one contract to another, logically it resides in the source contract (the contract from which the type was moved). In this example, the original (source) contract contains a forwarding declaration of the moved type that points to the type's current location in the destination contract. This allows such a moved type to be defined only once to avoid inconsistencies resulting from multiple declarations of the type. The phrase "logically resides" in a contract typically indicates that a forwarding declaration resides in the contract. Note that a forwarding declaration in a first contract could indicate a second contract that includes another forwarding declaration to a third contract, etc., until a contract is indicated that defines the particular moved type or the like.

An API contract is implemented in its entirety or not at all. In general, a platform must implement a contract in its entirety or not at all. This guarantees that an application finding a particular contract can assume successfully that the contract (and its corresponding executable module(s)) is fully implemented and provides the entire functionality expected.

There is no numeric relationship between versions of different API contracts. Given two contracts A and B, no assumptions can be made about the contract based on the relative versions numbers of these two contracts.

Changes to an API contract require incrementing its version. In general, when a type or the like in a contract is added or changed, the contract's current version is incremented.

Types in a contract include a version. Each type in a contract includes a type version attribute that indicates the version of the contract at which the type was added to the contract.

All types, except for run-time classes and enumerations, in a contract are immutable. Once defined, types in a contract (except for run-time classes and enums) are fixed and can never change.

Run-time class and enumeration types in a contract are immutable or additively versioned. That is, a run-time class and/or an enumeration type in a contract can have a new aspect(s) added, but no existing aspect can be removed or otherwise altered from that type.

CONCLUSION

In a first example, a method is performed on a computing device that includes at least one processor and memory, the method for programmatically providing a feature to a contract application via an application programming interface ("API") contract, the method comprising: hosting, by the computing device, the API contract that is configured for programmatically providing the feature to the application, where the API contract comprises identification information for the API contract, version information for the API contract and the feature, definition information that defines aspects of the feature, and executable code configured for responding to queries about the API contract.

In a second example, a system comprising a computing device and at least one program module are together configured for performing actions for programmatically providing a feature to a contract application via an application programming interface ("API") contract, the computing device including at least one processor and memory, the actions comprising: hosting, by the computing device, the API contract that is configured for programmatically providing the feature to the contract application, where the API contract comprises identification information for the API contract, version information for the API contract and the feature, definition information that defines aspects of the feature, and executable code configured for responding to queries about the API contract.

In a third example, at least one computer-readable medium stores computer-executable instructions that, when executed by at least one processor of a computing device, cause the computing device to perform actions programmatically providing a feature to a contract application via an application programming interface ("API") contract, the computing device including at least one memory, the actions comprising: hosting, by the computing device, the API contract that is configured for programmatically providing the feature to the application, where the API contract comprises identification information for the API contract, version information for the API contract and the feature, definition information that defines aspects of the feature, and executable code configured for responding to queries about the API contract.

In the first, second, and third examples, the API contract is discoverable at run-time; and/or the API contract is associated with a corresponding executable module that implements at least a portion of the feature; and/or a type defined by the API contract includes a type version attribute that indicates the version of the contract at which the type was added to the contract; and/or the version information includes a current version of the API contract; and/or the current version is equal to or greater than all versions indicated by any type version attributes included in the definition information; and/or any types defined in the definition information are immutable or additively versioned.

In a fourth example, a method is performed on a computing device that includes at least one processor and memory, the method for programmatically providing features of a contract platform to a contract application via at least one set of application programming interface ("API") contracts, the method comprising: hosting, by the computing device, the at least one set of API contracts that are each configured for programmatically providing one of the features to the contract application, where the each API contract comprises identification information for the each API contract, version information for the each API contract and its provided feature, definition information that defines aspects of its provided feature, and executable code configured for responding to queries about the each API contract.

In the fourth example, a system comprising a computing device and at least one program module are together configured for performing actions, the computing device including at least one processor and memory, the actions consistent with the steps of the method; and/or at least one computer-readable medium stores computer-executable instructions that, when executed by a processor of a computing device, cause the computing device to perform actions, the computing device including at least one memory, the actions consistent with the steps of the method.

In a fifth example, a method is performed on a computing device that includes at least one processor and memory, the method for programmatically accessing, by a contract application, a feature provided via an application programming interface ("API") contract, the method comprising: executing, by the computing device, the contract application that is configured for programmatically accessing, via the API contract, the feature, identification information of the API contract, version information of the API contract and the feature, definition information that defines aspects of the feature, and executable code configured for responding to queries about the API contract.

In the fifth example, a system comprising a computing device and at least one program module are together configured for performing actions, the computing device including at least one processor and memory, the actions consistent with the steps of the method; and/or at least one computer-readable medium stores computer-executable instructions that, when executed by a processor of a computing device, cause the computing device to perform actions, the computing device including at least one memory, the actions consistent with the steps of the method.

In a sixth example, a method is performed on a computing device that includes at least one processor and memory, the method for programmatically accessing, by tooling of a development environment, a feature provided via an application programming interface ("API") contract, the method comprising: executing, by the computing device, the tooling that is configured for programmatically accessing, via the API contract, the feature, identification information of the API contract, version information of the API contract and the feature, definition information that defines aspects of the feature, and executable code configured for responding to queries about the API contract.

In the sixth example, a system comprising a computing device and at least one program module are together configured for performing actions, the computing device including at least one processor and memory, the actions consistent with the steps of the method; and/or at least one computer-readable medium stores computer-executable instructions that, when executed by a processor of a computing device, cause the computing device to perform actions, the computing device including at least one memory, the actions consistent with the steps of the method.

In view of the many possible embodiments to which the invention and the forgoing examples may be applied, it should be recognized that the examples described herein are meant to be illustrative only and should not be taken as limiting the scope of the invention. Therefore, the invention as described herein contemplates all such embodiments that may fall within the scope of the claims, and any equivalents thereto.

The invention claimed is:

1. A method performed on a computing device that includes at least processor and memory, the method for programmatically providing a feature to a contract application via an application programming interface ("API") contract, the method comprising: hosting, by the computing device, the API contract that is configured for programmatically providing the feature to the application, where the API contract comprises identification information for the API contract, version information for the API contract and the feature, definition information that defines aspects of the feature, and executable code configured for responding to queries about the API contract.

2. The method of claim 1 where the API contract is discoverable at run-time.

3. The method of claim 1 where the API contract is associated with a corresponding executable module that implements at least a portion of the feature.

4. The method of claim 1 where a type defined by the API contract includes a type version attribute that indicates a version of the API contract at which the type was added to the API contract.

5. The method of claim 1 where the version information includes a current version of the API contract.

6. The method of claim 5 where the current version is equal to or greater than all versions indicated by any type version attributes included in the definition information.

7. The method of claim 1 where any types defined in the definition information are immutable or additively versioned.

8. A system comprising a computing device and at least one program module that are together configured for performing actions for programmatically providing a feature to a contract application via an application programming interface ("API") contract, the computing device including at least one processor and memory, the actions comprising: hosting, by the computing device, the API contract that is configured for programmatically providing the feature to the contract application, where the API contract comprises identification information for the API contract, version information for the API contract and the feature, definition information that defines aspects of the feature, and executable code configured for responding to queries about the API contract.

9. The system of claim 8 where the API contract is discoverable at run-time.

10. The system of claim 8 where the API contract is associated with a corresponding executable module that implements at least a portion of the feature.

11. The system of claim 8 where a type defined by the API contract includes a type version attribute that indicates a version of the API contract at which the type was added to the API contract.

12. The system of claim 8 where the version information includes a current version of the API contract.

13. The system of claim 12 where the current version is equal to or greater than all versions indicated by any type version attributes included in the definition information.

14. The system of claim 8 where any types defined in the definition information are immutable or additively versioned.

15. At least one computer-readable medium storing computer-executable instructions that, when executed by at least one processor of a computing device, cause the computing device to perform actions programmatically providing a feature to a contract application via an application programming interface ("API") contract, the computing device including at least one memory, the actions comprising: hosting, by the computing device, the API contract that is configured for programmatically providing the feature to the application, where the API contract comprises identification information for the API contract, version information for the API contract and the feature, definition information that defines aspects of the feature, and executable code configured for responding to queries about the API contract.

16. The at least one computer-readable medium of claim 15 where the API contract is discoverable at development-time the API contract is implied or indicated by source code.

17. The at least one computer-readable medium of claim 15 where the API contract is associated with a corresponding executable module that implements at least a portion of the feature.

18. The at least one computer-readable medium of claim 15 where a type defined by the API contract includes a type version attribute that indicates a version of the API contract at which the type was added to the API contract.

19. The at least one computer-readable medium of claim 15 where the version information includes a current version of the API contract that is equal to or greater than all versions indicated by any type version attributes included in the definition information.

20. The at least one computer-readable medium of claim 15 where any types defined in the definition information are immutable or additively versioned.

21. A method performed on a computing device that includes at least one processor and memory, the method for programmatically providing features of a contract platform to a contract application via at least one set of application programming interface ("API") contracts, the method comprising: hosting, by the computing device, the at least one set of API contracts that are each configured for programmatically providing one of the features to the contract application, where the each API contract comprises identification information for the each API contract, version information for the each API contract and its provided feature, definition information that defines aspects of its provided feature, and executable code configured for responding to queries about the each API contract.

22. A method performed on a computing device that includes at least one processor and memory, the method for programmatically accessing, by a contract application, a feature provided via an application programming interface ("API") contract, the method comprising: executing, by the computing device, the contract application that is configured for programmatically accessing, via the API contract, the feature, identification information of the API contract, version information of the API contract and the feature, definition information that defines aspects of the feature, and executable code configured for responding to queries about the API contract.

23. A method performed on a computing device that includes at least one processor and memory, the method for programmatically accessing, by tooling of a development environment, a feature provided via an application programming interface ("API") contract, the method comprising: executing, by the computing device, the tooling that is configured for programmatically accessing, via the API contract, the feature, identification information of the API contract, version information of the API contract and the feature, definition information that defines aspects of the feature, and executable code configured for responding to queries about the API contract.

* * * * *